US011299023B2

(12) United States Patent
McManaman et al.

(10) Patent No.: US 11,299,023 B2
(45) Date of Patent: Apr. 12, 2022

(54) LOCATOR FASTENER WITH BOLT MIS-ALIGNMENT FEATURE

(71) Applicant: Ford Global Technologies, LLC, Dearborn, MI (US)

(72) Inventors: James McManaman, West Bloomfield, MI (US); Tommy M. Gunther, Canton, MI (US); Steven Droste, Ypsilanti, MI (US); Rajaram Subramanian, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1614 days.

(21) Appl. No.: 15/044,298

(22) Filed: Feb. 16, 2016

(65) Prior Publication Data
US 2017/0232916 A1    Aug. 17, 2017

(51) Int. Cl.
*B60R 16/04* (2006.01)
*F16B 37/14* (2006.01)
*H01M 2/10* (2006.01)
*B60K 1/04* (2019.01)
*B60L 50/60* (2019.01)
*H01M 50/20* (2021.01)

(52) U.S. Cl.
CPC ............... *B60K 1/04* (2013.01); *B60L 50/66* (2019.02); *B60R 16/04* (2013.01); *F16B 37/14* (2013.01); *H01M 50/20* (2021.01); *H01M 2220/20* (2013.01)

(58) Field of Classification Search
CPC ........ B60R 16/04; B60K 1/04; H01M 2/1083; H01M 2/1077; H01M 2220/20; H01M 50/20; F16B 37/14; F16B 13/04; F16B 13/10; F16B 13/124; B60L 11/1877; B60L 50/64; B60L 50/66
See application file for complete search history.

(56) References Cited

U.S. PATENT DOCUMENTS

| 3,134,290 | A | * | 5/1964 | Jentoft | ................... | F16B 33/004 |
| | | | | | | 411/377 |
| 3,470,787 | A | * | 10/1969 | Mackie | ................. | F16B 33/004 |
| | | | | | | 264/250 |
| 5,037,259 | A | * | 8/1991 | Duran | ................... | F16B 37/062 |
| | | | | | | 411/173 |
| 6,860,689 | B1 | | 3/2005 | Attanasio | | |
| 7,156,599 | B2 | | 1/2007 | Clinch et al. | | |
| 2007/0297869 | A1 | * | 12/2007 | Kunda | ..................... | F16B 5/025 |
| | | | | | | 411/108 |
| 2012/0312614 | A1 | * | 12/2012 | Fujiwara | ............. | H01M 2/1077 |
| | | | | | | 180/68.5 |

FOREIGN PATENT DOCUMENTS

GB          687110       2/1953

* cited by examiner

*Primary Examiner* — Matthew W Van Oudenaren
(74) *Attorney, Agent, or Firm* — David B. Kelley; Brooks Kushman P.C.

(57) ABSTRACT

A fastener assembly includes a stud and a nut. The stud has a proximal end and a distal end with a body therebetween. The stud also has a central axis extending from the proximal end to the distal end. The proximal end has a flange for coupling to a surface. The body has a cavity opening to an orifice at the distal end. The nut is retained within the cavity. Rotation of the nut about the central axis is inhibited.

6 Claims, 5 Drawing Sheets

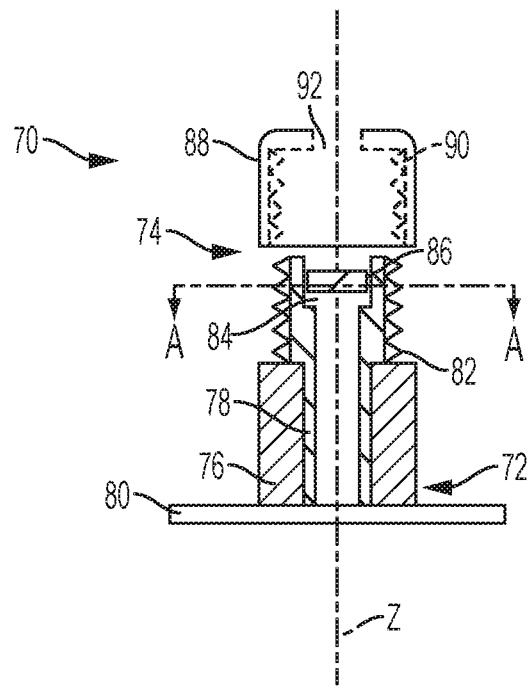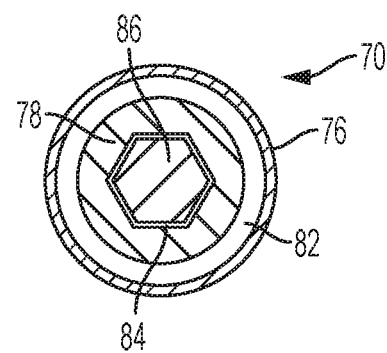
FIG. 4A  FIG. 4B
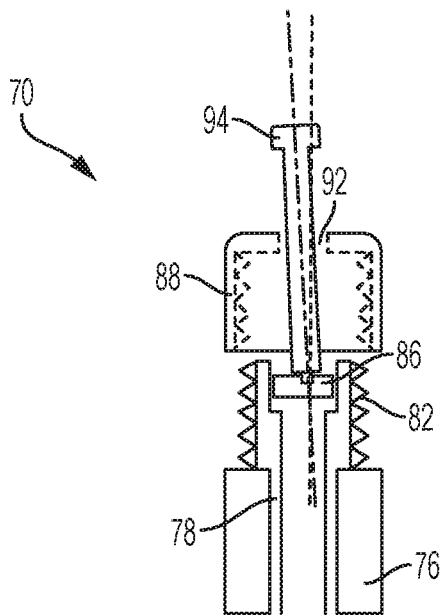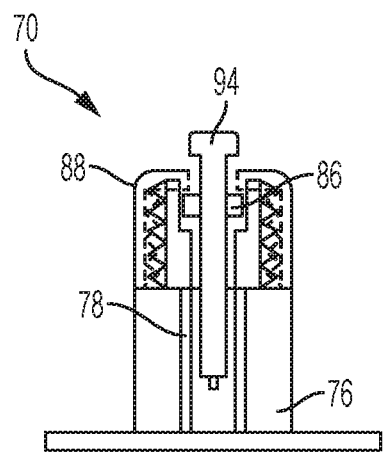
FIG. 4C  FIG. 4D

LOCATOR FASTENER WITH BOLT MIS-ALIGNMENT FEATURE

TECHNICAL FIELD

The present disclosure relates to a fastener assembly, particularly one for use in assembling battery packs for automotive vehicles.

BACKGROUND

Many automotive vehicles today are configured to be driven by electric machines instead of, or in addition to, internal combustion engines. Such vehicles include hybrid electric vehicles (HEVs), plug-in hybrid electric vehicles (PHEVs), and electric vehicles (EVs). Such vehicles often are provided with a high voltage battery pack to store electric energy for future consumption.

SUMMARY

A fastener assembly according to the present disclosure includes a stud and a nut. The stud has a proximal end and a distal end with a body therebetween. The stud also has a central axis extending from the proximal end to the distal end. The proximal end has a flange for coupling to a surface. The body has a cavity opening to an orifice at the distal end. The nut is retained within the cavity. Rotation of the nut about the central axis is inhibited.

According to a first embodiment, the body includes a slot in communication with the cavity and the nut includes a tang. In such an embodiment, the tang is engaged with the slot to inhibit rotation of the nut relative to the central axis.

According to a second embodiment, an internal volume of the cavity is greater than a volume of the nut, such that the nut is pivotable relative to the central axis.

According to a third embodiment, the fastener assembly additionally includes a cap disposed about the distal end of the stud. The cap retains the nut in the cavity. In a first variant, the distal end has an external threaded portion and the cap has an internal threaded portion, with the external threaded portion being engaged with the internal threaded portion. In a second variant, the cap is coupled to the distal end by brazing or adhesive.

A method of assembling an automotive vehicle according to the present disclosure includes providing a first component for assembly, a second component for assembly, a locating pin, and a fastener. The second component has an opening sized to accommodate the pin. The pin has a first end and a second end with a central axis extending from the first end to the second end. The pin additionally includes a pocket proximate the second end and a nut retained within the pocket. The nut is rotationally fixed relative to the central axis. The method additionally includes coupling the first end to the first component such that the second end projects from the first component. The method also includes inserting the second end into the opening to locate the second component in a desired position relative to the first component. The method further includes assembling the fastener to the nut to retain the second component in the desired position relative to the first component.

According to a first embodiment, the pin includes a welding flange at the first end. In such an embodiment, coupling the first end to the first component includes welding the welding flange to the first component.

According to a second embodiment, the pocket has an interior volume greater than an exterior volume of the nut, such that the nut is pivotable relative to the central axis.

According to a third embodiment providing a pin includes disposing the nut in the pocket and assembling a cap over the second end. According to variants of this embodiment, assembling a cap over the second end may include threading the cap onto the second end and/or coupling the cap to the second end by brazing or adhesive.

According to a fourth embodiment, the pin includes a slot in communication with the pocket and the nut includes a tang, the tang being engaged with the slot to inhibit rotation of the nut relative to the central axis.

According to a fifth embodiment, the first component includes a battery pack housing and the second component includes a battery pack.

A battery pack assembly according to the present disclosure includes a battery pack having a mounting bore, a battery pack housing, and a mounting stud. The mounting stud has a first end coupled to the housing and a second end projected from the housing. The second end is inserted into the mounting bore. The stud has a central axis extending from the first end to the second end. The stud has a pocket opening to an orifice at the second end, with a nut retained within the pocket. The nut is rotationally fixed about the central axis. The battery pack assembly additionally includes a fastener coupled to the nut to retain the battery pack in the housing.

According to a first embodiment, the stud includes a slot in communication with the pocket. In addition, the nut includes a tang, which is engaged with the slot to inhibit rotation of the nut relative to the central axis.

According to a second embodiment, an internal height of the pocket is greater than an external height of the nut, such that the nut is pivotable relative to the central axis.

According to a third embodiment, the battery pack assembly additionally includes a cap disposed about the second end of the stud to retain the nut in the pocket. In a first variant, the second end has an external threaded portion and the cap has an internal threaded portion, with the external threaded portion being engaged with the internal threaded portion. In a second variant, the cap is coupled to the second end by brazing or adhesive.

Embodiments according to the present disclosure provide a number of advantages. For example, the present disclosure provides a fastener assembly that combines the utility of a locator pin and a mounting nut, thus providing space savings. Moreover, the present disclosure provides a fastener assembly with a nut capable of receiving off-center fasteners.

The above advantage and other advantages and features of the present disclosure will be apparent from the following detailed description of the preferred embodiments when taken in connection with the accompanying drawings.

BRIEF DESCRIPTION OF THE DRAWINGS

FIGS. 4A-4D illustrate cross-sectional views of a second embodiment of a locator stud fastener assembly according to the present disclosure.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In HEV, PHEV, and BEV design, a desire to increase battery capacity must be balanced against the packaging constraints of the vehicle. Relatively limited vehicle package envelopes for high voltage battery packs thus make it desirable to increase the energy density of battery pack designs.

One challenge associated with high voltage battery packs is to provide space for locators and attachment features for internal components of the pack. Attachment features must provide adequate tool clearance and ensure adequate bearing surface and thread engagement.

Figure 1:
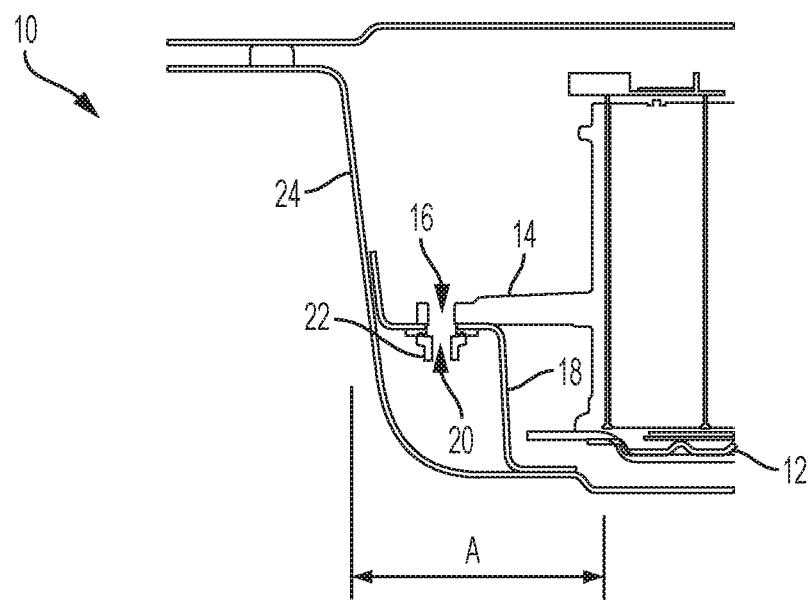
FIG. 1 illustrates a cross-sectional view of a battery pack assembly according to the prior art.

Referring now to FIG. 1, an exemplary battery pack assembly 10 according using traditional mounting features is shown in cross section. A battery pack 12 includes a plurality of battery cells. A flange 14 extends from a side of the battery pack 12. The flange 14 has a first fastener hole 16. A mounting bracket 18 has a second fastener hole 20. The size and location of the second fastener hole 20 correspond to those of the first fastener hole 16. A nut 22 is welded to an underside surface of the second fastener hole 20. In addition, a locating pin (not shown in this view) protrudes from an inner surface of the mounting bracket 18. A corresponding hole in the flange 14 is aligned with the locating pin, and the locating pin is inserted into the hole in the flange 14 to ensure proper positioning of the battery pack 12 relative to the mounting bracket 18. A fastener (not shown) is threaded into the nut 22 to fasten the flange 14 to the mounting bracket 18. The battery pack 12 is then disposed in a housing 24. The mounting bracket 18 may subsequently be fastened or welded to the housing 24. The flange 14 and mounting bracket 18 are provided because there is otherwise inadequate tool clearance to fasten the battery pack 12 directly to the housing 24, due to the relatively tight packaging of the battery pack 12 within the housing 24.

This arrangement provides satisfactory positioning of the battery pack 12 relative to the housing 24, and additionally provides satisfactory attachment of the battery pack 12 to the housing 24. However, the mounting bracket 18 extends a distance A from the sidewall of the battery pack 12. The distance A varies based on the particular application, but (as will be discussed below), adds a significant amount of width to the battery pack assembly 10. Moreover, an additional mounting bracket 18 is used at an opposite side of the battery pack 12. In addition, many vehicles include at least two battery pack assemblies 10 in a side-by-side configuration. Thus, the total width added by the mounting brackets 18 may be 4A or more.

Figure 2:
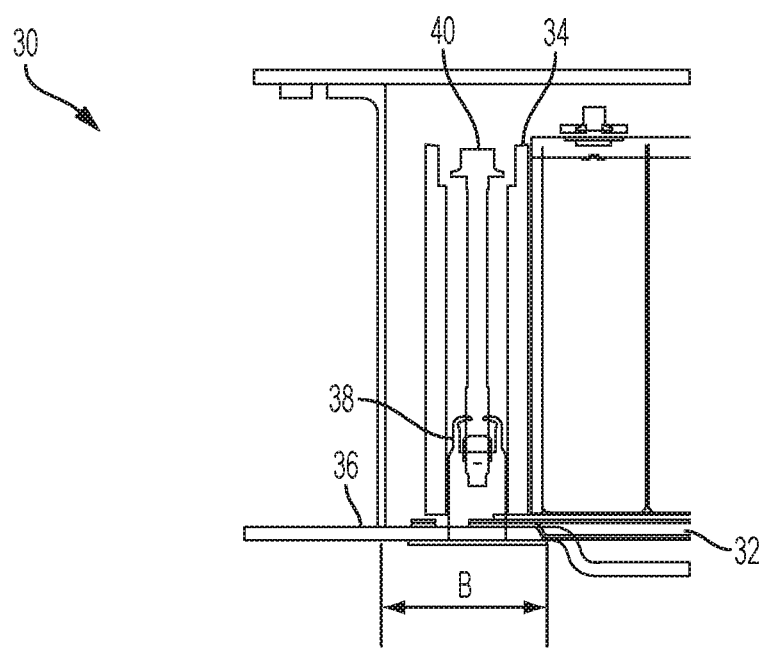
FIG. 2 illustrates a cross-sectional view of a battery pack assembly according to the present disclosure.

Referring now to FIG. 2, a battery pack assembly 30 according to the present disclosure is shown. The battery pack assembly 30 includes a battery pack 32. A mounting bore 34 is provided at an end of the battery pack 32. The battery pack 32 is disposed within a housing 36. A mounting stud 38 is provided within the housing 36. The mounting stud 38 acts as both a locating pin and fastener receptor, as will be discussed in further detail below. During assembly of the battery pack 32 into the housing 36, the mounting bore 34 is aligned with the mounting stud 38, and the mounting stud 38 is inserted into the mounting bore 34. A fastener 40 may then be used to secure the mounting bore 34 to the mounting stud 38, and thus secure the battery pack 32 within the housing 36.

The mounting bore 34 extends a distance B from the end of the battery pack 32. While the distance B may depend on the particular application, the distance B may be 15-30 mm less than the distance A of a traditional design. In addition, a similar mounting bore and mounting stud arrangement is located at an opposite side of the battery pack assembly 30. Thus, in an automotive vehicle having two battery pack assemblies 30 in a side-by-side arrangement, embodiments according to the present disclosure may save up to 120 mm.

As an additional advantage, embodiments according to the present disclosure obviate the nut 22 mounted to the underside of the mounting bracket 18, thus resulting in a vertical space savings as well. Depending on the configuration, a vertical space savings of approximately 12-15 mm may be obtained.

Because embodiments according to the present disclosure provide substantial space savings in both a horizontal and vertical direction, these embodiments may enable larger battery packs to be used, vehicles to be made smaller, or both.

Figure 3A:
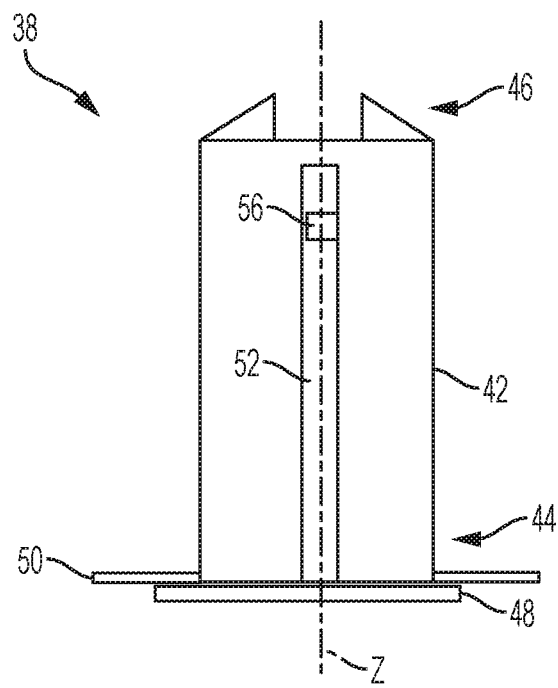
FIGS. 3A-3D illustrate various views of a first embodiment of a locator stud fastener assembly according to the present disclosure.
Figure 3B:
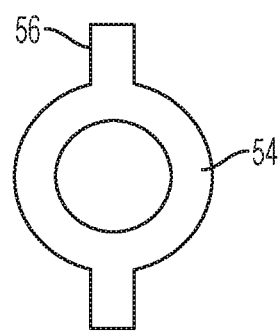

Referring now to FIGS. 3A-3B, the mounting stud 38 is shown in further detail. The mounting stud 38 has an elongate body 42 extending along a central axis Z from a proximal end 44 to a distal end 46. A welding flange 48 extends from the proximal end 44. The proximal end 44 may be secured to a housing wall 50 by welding the welding flange 48 to the housing wall 50. At least one channel 52 extends along at least a portion of the body 42. A nut 54 having at least one tang 56 is retained within the body 42 proximate the distal end 46. The tang 56 is engaged with the channel 52 to inhibit rotation of the nut 54 about the central axis Z.

Figure 3C:
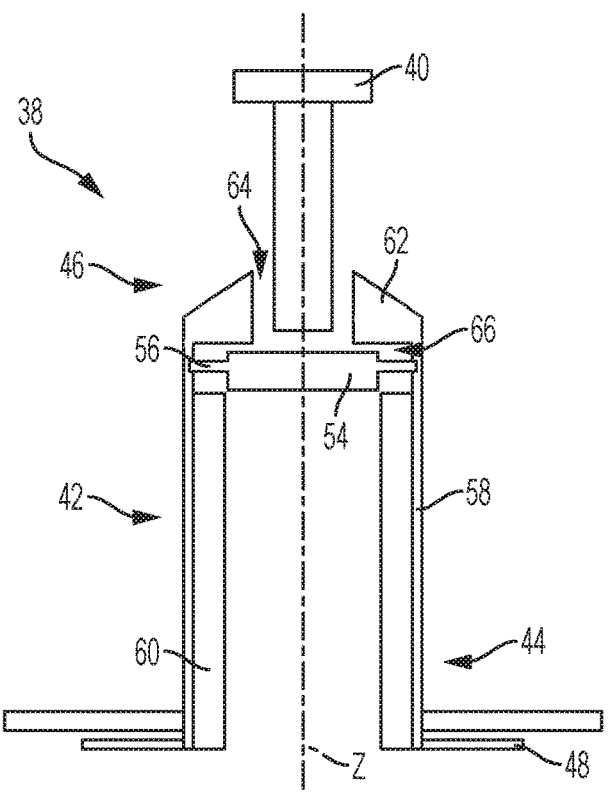

Referring now to FIG. 3C, the mounting stud 38 is shown in cross-section. In this embodiment, the body 42 includes an outer sleeve 58 extending about and retaining an inner sleeve 60. Both the outer sleeve 58 and the inner sleeve 60 extend generally along the central axis Z. The outer sleeve 58 and inner sleeve 60 are each hollow members having central bores extending along the central axis Z. The outer sleeve 58 may be coupled to the inner sleeve 60 via various known techniques, such as adhesives, brazing, fasteners, threaded attachment, or any other appropriate technique.

At the proximal end 44, the welding flange 48 extends from the periphery of the outer sleeve 58. The welding flange 48 may be a separate component joined with the outer sleeve 58, or may be an integrally-formed feature of the outer sleeve 58.

At the distal end, a cap 62 is provided at the open end of the outer sleeve 58. The cap 62 partially closes the open end of the outer sleeve 58, while leaving an aperture 64 open to receive a fastener 40. In this embodiment, the cap 62 has a tapered profile to assist in locating a mounting bore relative to the mounting stud 38. In other embodiments, other profile shapes may be used, such as providing a cap with a relative flat upper surface.

The outer sleeve 58 has a length along the central axis Z that exceeds the length of the inner sleeve 60. As such, a pocket or cavity 66 is formed at the proximal end in the space between the end of the inner sleeve 60 and the inner face of the cap 62. The nut 54 is retained within the cavity 66 and positioned to receive a fastener 40.

Figure 3D:
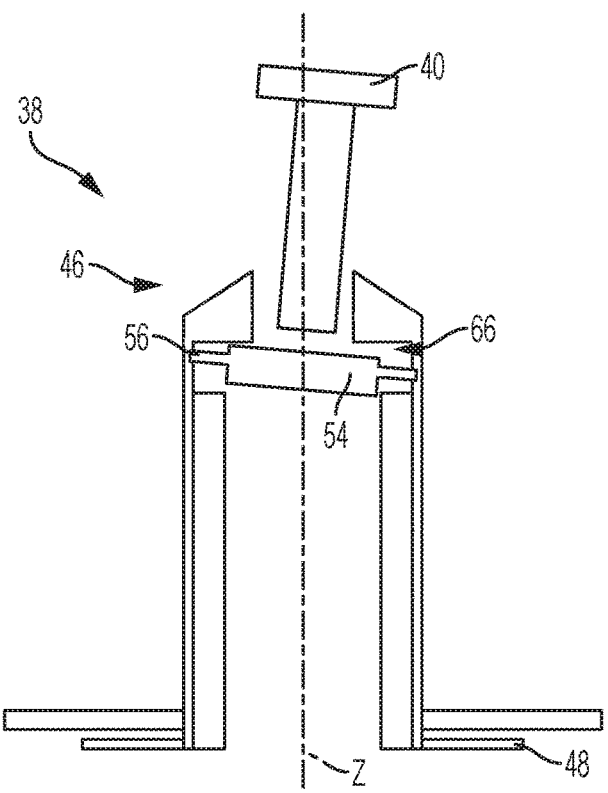

In a preferred embodiment, the volume of the cavity 66 exceeds the volume of the nut 54, e.g. the interior height of the cavity 66 is greater than a height of the nut 54. As a result, the nut 54 may pivot relative to the central axis Z, as shown in FIG. 3D. The nut 54 may thus accommodate a fastener 40 which is inserted off-center or off-axis relative to the central axis Z. Because the fasteners used in assembling battery packs may be relatively long, as shown in FIG. 2, relatively small misalignments at the fastener head may result in substantial misalignments at the fastener tip. As a result, the capacity of the fastener assembly shown in FIGS. 3A-3D to accommodate misaligned fasteners contributes to robustness and ease of assembly.

Referring to FIGS. 4A-4D, an alternative embodiment of a fastener assembly according to the present disclosure is shown. In this embodiment, a mounting stud 70 extends from a proximal end 72 to a distal end 74. The mounting stud 70 includes an outer sleeve 76 and an inner sleeve 78, both extending generally along a central axis Z. The outer sleeve 76 and inner sleeve 78 are each hollow members having central bores extending along the central axis Z. The proximal end 72 is coupled to a housing wall 80, for example by a welding flange (not shown in this view). The inner sleeve 78 has a height that exceeds the height of the outer sleeve 76, such that at the proximal end 72 the inner sleeve 78 is retained within the outer sleeve 76 and at the distal end 74 the inner sleeve 78 protrudes from the outer sleeve 76. The outer sleeve 76 may be coupled to the inner sleeve 78 via various known techniques, such as adhesives, brazing, fasteners, threaded attachment, or any other appropriate technique. In an alternative embodiment, the outer sleeve 76 and the inner sleeve 78 are formed as a unitary piece. The inner sleeve 78 is provided with an external threaded portion 82 proximate the distal end 74.

At the distal end 74, a pocket or cavity 84 is provided in the inner sleeve 78. A nut 86 is retained in the cavity 84. As shown in FIG. 4B, illustrating a detail view A-A from FIG. 4A, the profile of the cavity 84 and the profile of the nut 86 correspond to inhibit rotation of the nut 86 about the central axis Z.

A removable cap 88 having an internal threaded portion 90 is assembled onto the distal end 74 by engaging with the external threaded portion 82. The removable cap 88 partially closes the open end of the inner sleeve 78, while leaving an aperture 92 open to receive a fastener 94. The removable cap 88 retains the nut 86 within the cavity 84.

In a preferred embodiment, the volume of the cavity 84 exceeds the volume of the nut 86, e.g. the interior height of the cavity 84 is greater than a height of the nut 86. As a result, the nut 86 may pivot relative to the central axis Z, as shown in FIG. 4C. The nut 86 may thus accommodate a fastener 94 which is inserted off-center or off-axis relative to the central axis Z, as shown in FIG. 4C, while resulting in a satisfactory assembly, as shown in FIG. 4D. This capacity to accommodate misaligned fasteners may improve robustness of the assembly, as discussed above with respect to FIGS. 3A-3D.

Variations on the above are, of course, possible. As an example, in a variation of the embodiment shown in FIGS. 4A-4D, the removable cap may be secured to the inner sleeve 78 via brazing or adhesive instead of, or in addition to, a threaded connection.

Figure 5:
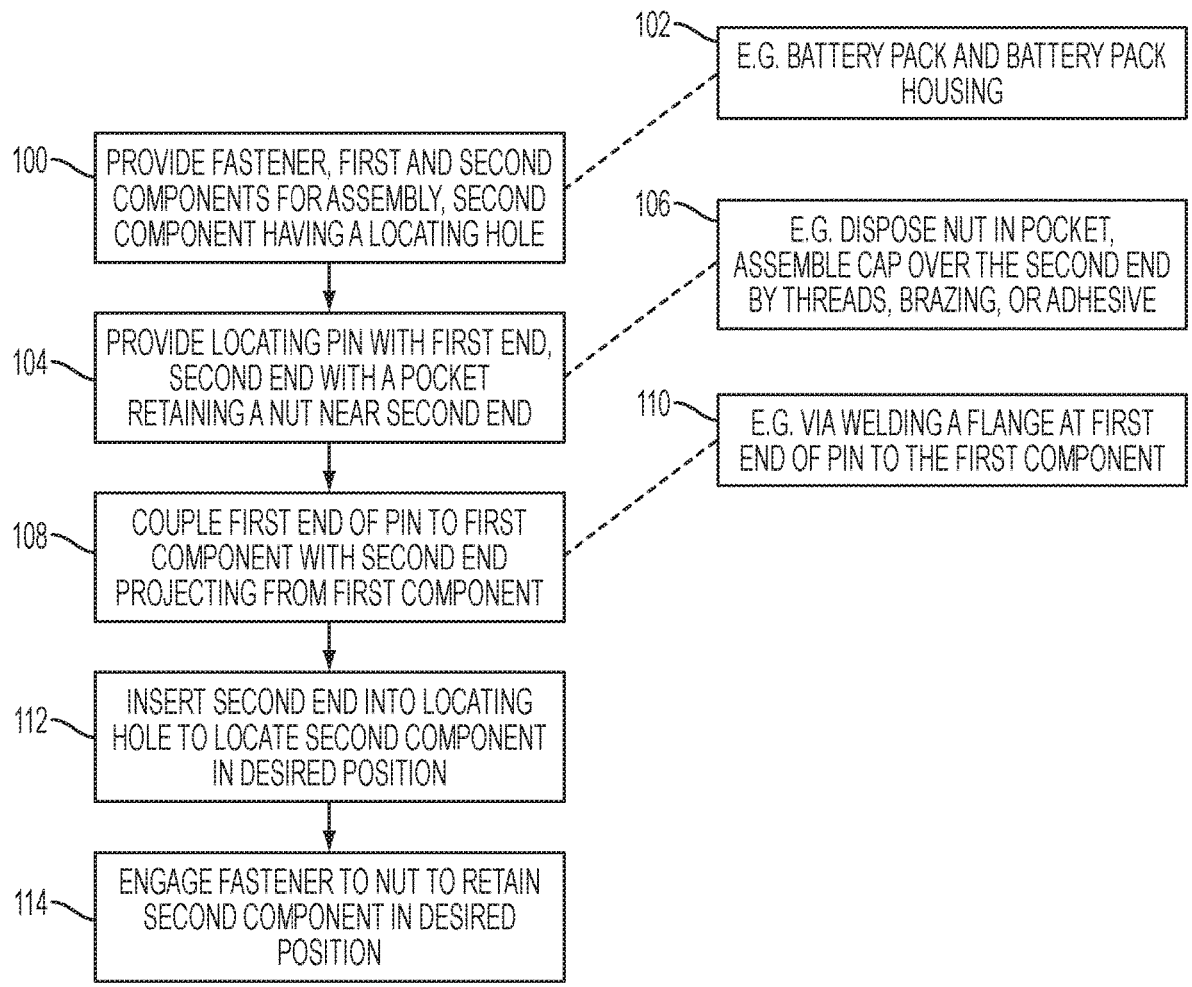
FIG. 5 is a flowchart illustrating a method of assembling components of an automotive vehicle according to the present disclosure.

Referring now to FIG. 5, a method of assembling components of an automotive vehicle according to the present disclosure is illustrated in flowchart form. A fastener, a first component for assembly, and a second component for assembly are provided, as illustrated in block 100. The second component has a locating hole. The first and second components may be a battery pack and housing, respectively, as illustrated in block 102.

A locating pin is provided, as illustrated in block 104. The locating pin has a first end, a second end, and a pocket near the second end. The pocket retains a nut. As illustrated in block 106, the providing step may include disposing the nut in the pocket, and assembling the cap over the second end. The cap may be assembled by a threaded connection, brazing, adhesive, or other appropriate techniques.

The first end of the locating pin is coupled to the first component, as illustrated in block 108. The second end projects from the first component. As illustrated in block 110, the coupling may include welding a welding flange at the first end of the pin, which is welded to the first component.

The second end of the locating pin is inserted into the locating hole to locate and retain the second component in a desired position relative to the first component, as illustrated in block 112.

A fastener is then engaged to the nut to retain the second component in the desired position, as illustrated in block 114.

As may be seen, the present disclosure provides a fastener assembly that combines the utility of a locator pin and a mounting nut, thus providing space savings. Moreover, the present disclosure provides a fastener assembly with a nut capable of accommodating off-center fasteners, improving robustness and ease of use.

While the fastener assembly has been discussed above largely with respect to battery pack assemblies, it should be noted that embodiments according to the present disclosure may provide similar benefits when used in other applications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery pack assembly comprising:
   a battery pack having a mounting bore;
   a battery pack housing;
   a mounting stud having a first end coupled to the housing and a second end projected from the housing and inserted into the mounting bore, the mounting stud having a central axis extending from the first end to the second end, the mounting stud having a pocket opening to an orifice at the second end, the mounting stud having a nut retained within the pocket, the nut being rotationally fixed about the central axis; and
   a fastener coupled to the nut to retain the battery pack in the housing.

2. The battery pack assembly of claim 1, wherein the mounting stud includes a slot in communication with the pocket and the nut includes a tang, the tang being engaged with the slot to inhibit rotation of the nut relative to the central axis.

3. The battery pack assembly of claim 1, wherein an internal height of the pocket is greater than an external height of the nut, such that the nut is pivotable relative to the central axis.

4. The battery pack assembly of claim 1, further comprising a cap disposed about the second end of the mounting stud to retain the nut in the pocket.

5. The battery pack assembly of claim 4, wherein the second end comprises an external threaded portion and the cap comprises an internal threaded portion, the external threaded portion being engaged with the internal threaded portion.

6. The battery pack assembly of claim 4, wherein the cap is coupled to the second end by brazing or adhesive.

\* \* \* \* \*